United States Patent
Yu et al.

(10) Patent No.: US 12,462,221 B2
(45) Date of Patent: Nov. 4, 2025

(54) ORDER PROCESSING METHOD, APPARATUS, AND DEVICE, WAREHOUSING SYSTEM, AND STORAGE MEDIUM

(71) Applicant: SHENZHEN KUBO SOFTWARE CO., LTD, Guangdong (CN)

(72) Inventors: Runfang Yu, Guangdong (CN); Hongxia Zhou, Guangdong (CN)

(73) Assignee: SHENZHEN KUBO SOFTWARE CO., LTD., Guangdong (CN)

( * ) Notice: Subject to any disclaimer, the term of this patent is extended or adjusted under 35 U.S.C. 154(b) by 242 days.

(21) Appl. No.: 18/365,626

(22) Filed: Aug. 4, 2023

(65) Prior Publication Data
US 2023/0376898 A1    Nov. 23, 2023

Related U.S. Application Data

(63) Continuation of application No. PCT/CN2022/072838, filed on Jan. 19, 2022.

(30) Foreign Application Priority Data

Feb. 9, 2021  (CN) .......................... 202110178236.4

(51) Int. Cl.
*G06Q 10/087*    (2023.01)
(52) U.S. Cl.
CPC .................................. *G06Q 10/087* (2013.01)
(58) Field of Classification Search
CPC ........... G06Q 10/087; G06Q 10/06312; G06Q 10/06316; G06Q 10/0633; G06Q 10/083;
(Continued)

(56) References Cited

U.S. PATENT DOCUMENTS 6,289,260 B1 *   9/2001   Bradley ............... B65G 1/1376
                                                            414/280
8,756,119 B1    6/2014   Andrews et al.
(Continued)

FOREIGN PATENT DOCUMENTS

CN    108122082 A    6/2018
CN    108658011 A    10/2018
(Continued)

OTHER PUBLICATIONS

Notice of Reasons for Refusal for Japanese Application No. 2023-548314, dated Jul. 9, 2024.
(Continued)

*Primary Examiner* — Garcia Ade
(74) *Attorney, Agent, or Firm* — Frank Gao, Esq.

(57) ABSTRACT

Embodiments of this application provide an order processing method, apparatus, and device, a warehousing system, and a storage medium. The order processing method includes: obtaining a first order; and combining the first order with a second order, so that goods corresponding to the first order are placed in a slot corresponding to the second order, where the second order is an order being processed by a workstation. This implements order combination of the order being processed by the workstation, without occupying an additional slot of the workstation, thereby improving space utilization of a slot of the workstation and order processing efficiency.

21 Claims, 4 Drawing Sheets

(58) Field of Classification Search
CPC .. G06Q 30/0635; G06Q 10/047; G06Q 10/08; G06Q 10/0875; B65G 1/1373
See application file for complete search history.

(56) References Cited

U.S. PATENT DOCUMENTS

| | | | |
|---|---|---|---|
| 9,975,699 | B2 | 5/2018 | Yamashita |
| 10,832,209 | B2 * | 11/2020 | Rajkhowa ............ G06Q 10/087 |
| 2003/0171962 | A1 * | 9/2003 | Hirth .................... G06Q 10/087 705/7.25 |
| 2019/0266555 | A1 * | 8/2019 | Rajkhowa ........ G06Q 10/06312 |
| 2019/0325377 | A1 | 10/2019 | Rajkhowa et al. |
| 2024/0124237 | A1 * | 4/2024 | Cao ........................ G06Q 10/08 |
| 2025/0094922 | A1 * | 3/2025 | Li ........................ G06Q 10/087 |

FOREIGN PATENT DOCUMENTS

| | | |
|---|---|---|
| CN | 109772714 A | 5/2019 |
| CN | 110070312 A | 7/2019 |
| CN | 110111033 A | 8/2019 |
| CN | 110675102 A | 1/2020 |
| CN | 110826945 A | 2/2020 |
| CN | 111626652 A | 9/2020 |
| CN | 111932186 A | 11/2020 |
| CN | 112184103 A | 1/2021 |
| CN | 112308476 A | 2/2021 |
| CN | 112907170 A | 6/2021 |
| JP | 2015506324 A | 3/2025 |
| TW | 201617983 A | 5/2016 |
| WO | WO2016117111 A1 | 7/2016 |
| WO | WO2018126943 A1 | 7/2018 |

OTHER PUBLICATIONS

European Search Report dated Jul. 15, 2024, Application No. 22752097.0.
International Search Report mailed Apr. 20, 2022; PCT/CN2022/072838 with English Translation.

* cited by examiner

ORDER PROCESSING METHOD, APPARATUS, AND DEVICE, WAREHOUSING SYSTEM, AND STORAGE MEDIUM

CROSS-REFERENCE TO RELATED APPLICATIONS

This application is a continuation of International Patent Application No. PCT/CN2022/072838 filed on Jan. 19, 2022, which claims priority to Chinese Patent Application No. 202110178236.4, filed with the China National intellectual Property Administration on Feb. 9, 2021 and entitled "ORDER PROCESSING METHOD, APPARATUS, AND DEVICE, WAREHOUSING SYSTEM, AND STORAGE MEDIUM", which are incorporated herein by references in their entireties.

TECHNICAL FIELD

This application relates to the field of intelligent warehousing technologies, and in particular, to an order processing method, apparatus, and device, a warehousing system, and a storage medium.

BACKGROUND

A warehousing robot-based intelligent warehousing system uses an intelligent operating system, and implements automatic outbound and outbound operations of goods through system instructions. In addition, the system can operate 24 hours a day without interruption to replace manual management and operation, and therefore improves the efficiency of warehousing and has been widely applied and favored.

When the intelligent warehousing system receives a plurality of orders of a same batch, before sending the plurality of orders to a workstation for processing, it needs to combine the plurality of orders into a new order, and then the workstation processes the new combined order, so as to complete a corresponding order task.

However, in conventional technologies, after an order or a combined order is sent to a workstation for processing, such as sorting, an order being processed cannot be changed, and a subsequent order can be processed only after the order being processed is completed. When a task amount corresponding to the order being processed is relatively small, there is relatively large free space of a slot of a tote used to accommodate the order on the workstation, resulting in relatively low space utilization of a slot and relatively low order processing efficiency.

SUMMARY

This application provides an order processing method, apparatus, and device, a warehousing system, and a storage medium. This achieves order addition to an order being processed by a workstation, without occupying an additional slot, thereby improving slot space utilization and order processing efficiency.

According to a first aspect, an embodiment of this application provides an order processing method. The method includes:

obtaining a first order; and combining the first order with a second order, so that goods corresponding to the first order are placed in a slot corresponding to the second order, where the second order is an order being processed by the workstation.

Optionally, the combining the first order with a second order includes:

combining order requirements of the first order and the second order to obtain a combined order, where a slot corresponding to the combined order is the same as the slot corresponding to the second order.

Optionally, the combining the first order with a second order includes:

determining whether the first order and the second order meet a combination condition; and if the combination condition is met, combining the first order with the second order.

Optionally, the combination condition includes a storage restriction condition of the slot corresponding to the second order, a cut-off time restriction condition, and/or a restriction condition for an order attribute; and when the first order and the second order do not meet one or more of the storage restriction condition, the cut-off time restriction condition, and the restriction condition for the order attribute, it is determined that the first order and the second order do not meet the combination condition.

Optionally, the storage restriction condition includes a volume limit, a limit for a quantity of pieces, and an order quantity limit, and before the determining whether the first order and the second order meet a combination condition, the method further includes:

obtaining a total order quantity, a total quantity of goods, and a total storage volume corresponding to the combined order, where the combined order is an order corresponding to the first order and the second order after pre-combination.

Correspondingly, the determining whether the first order and the second order meet the storage restriction condition includes determining whether the total order quantity exceeds the order quantity limit; determining whether the total quantity of goods exceeds the limit for the quantity of pieces; or determining whether the total storage volume exceeds the volume limit; and when a determining result of at least one of the foregoing is yes, determining that the first order and the second order do not meet the storage restriction condition.

Optionally, before the determining whether the first order and the second order meet a combination condition, the method further includes:

obtaining a first cut-off time of the first order and a second cut-off time of the second order; and the determining whether the first order and the second order meet the cut-off time restriction condition includes: determining whether a difference between the first cut-off time and the second cut-off time is greater than a preset difference; and if the difference is greater than the preset difference, determining that the first order and the second order do not meet the combination condition.

Optionally, the order attribute includes a batch combination attribute, an order type, and an order combination attribute, and the determining whether the first order and the second order meet the restriction condition for the order attribute includes:

determining whether batch combination attributes of the first order and the second order are inconsistent, where the batch combination attribute is used to describe whether a current order allows another order of a different batch to be mixed with the current order; determining whether order types of the first order and the second order are inconsistent; or determining whether an order combination attribute of the first order or the second order is prohibited order combination; and when a determining result of at least one of the foregoing is yes, determining that the first order and the second order do not meet the restriction condition for the order attribute.

Optionally, there are a plurality of workstations, and after the obtaining a first order, the method further includes:
determining at least one target workstation based on workstation attributes of the workstations; and obtaining second orders being processed by the at least one target workstation.

Correspondingly, the determining whether the first order and the second order meet a combination condition includes:
for each of the second orders on each target workstation, determining whether the first order and the second order meet the combination condition.

Optionally, before determining the target workstation based on the workstation attributes of the workstations, the method further includes:
obtaining each first workstation corresponding to the first order.

Correspondingly, the determining the target workstation based on the workstation attributes of the workstations includes:
determining the target workstation based on workstation attributes of the first workstations.

Optionally, the workstation attribute includes the order attribute and a rated order amount, and the determining the target workstation based on the workstation attributes of the workstations includes:
for each workstation, when the order attribute of the workstation is allowed order combination, obtaining the rated order amount of the workstation; determining whether the workstation meets an order reception condition based on the rated order amount and an order amount being processed; and if the workstation meets the order reception condition, determining the workstation as the target workstation.

According to a second aspect, an embodiment of this application provides an order processing apparatus. The apparatus includes:
a first order obtaining module, configured to obtain a first order; and an order Combination module, configured to combine the first order with a second order, so that goods corresponding to the first order are placed in a slot corresponding to the second order, where the second order is an order being processed by the workstation.

According to a third aspect, an embodiment of this application further provides an order processing device. The device includes a memory and at least one processor. The memory stores computer-executable instructions. The at least one processor executes the computer-executable instructions stored in the memory, so that the at least one processor performs the order processing method provided in any embodiment corresponding to the first aspect of this application.

According to a fourth aspect, an embodiment of this application further provides a warehousing system. The system includes a workstation and the order processing device provided in the embodiment corresponding to the third aspect of this application. The workstation includes at least one slot for placing a tote.

According to a fifth aspect, an embodiment of this application further provides a computer-readable storage medium. The computer-readable storage medium stores computer-executable instructions. When a processor executes the computer-executable instructions, the order processing method provided in any embodiment corresponding to the first aspect of this application is implemented.

According to a sixth aspect, an embodiment of this application further provides a computer program product, including a computer program. When the computer program is executed by a processor of an order processing device, the order processing device performs the order processing method provided in any embodiment corresponding to the first aspect of this application.

According to the order processing method, apparatus, and device, the warehousing system, and the storage medium provided in this application, for a second order being processed by a workstation, when a first order is obtained, the first order is combined with the second order, so that goods in the first order are placed in a slot corresponding to the second order, thereby improving space utilization of slots of the workstation. In addition, when there is no free slot in the workstation, the first order is processed without a need to wait for completion of processing of other orders, which improves order processing efficiency.

BRIEF DESCRIPTION OF THE DRAWINGS

The accompanying drawings here, which are incorporated into the specification and constitute a part of the specification, illustrate embodiments that conform to the present disclosure and are used together with the specification to explain the principles of the present disclosure.

Specific embodiments of the present disclosure are shown by the above drawings, and more detailed description will be given below. These drawings and text description are not for limiting the scope of the concept of the present disclosure in any way, but for illustrating the concept of the present disclosure for those skilled in the art by referring to specific embodiments.

DETAILED DESCRIPTION

Example embodiments are described in detail herein, and examples of the example embodiments are shown in the accompanying drawings. When the following description is related to the accompanying drawings, unless otherwise specified, same numerals in different accompanying drawings represent same or similar elements. Implementations described in the following example embodiments do not represent all implementations consistent with this application. On the contrary, the implementations are merely examples of an apparatus and a method that are consistent with some aspects of this application described in detail in claims.

The following describes the technical solutions of this application and how to resolve the foregoing technical problems according to the technical solutions of this application in detail by using specific embodiments. The following several specific embodiments may be combined with each other, and same or similar concepts or processes may not be described repeatedly in some embodiments. The following describes the embodiments of this application with reference to the accompanying drawings.

The following explains application scenarios of embodiments of this application.

Figure 1:
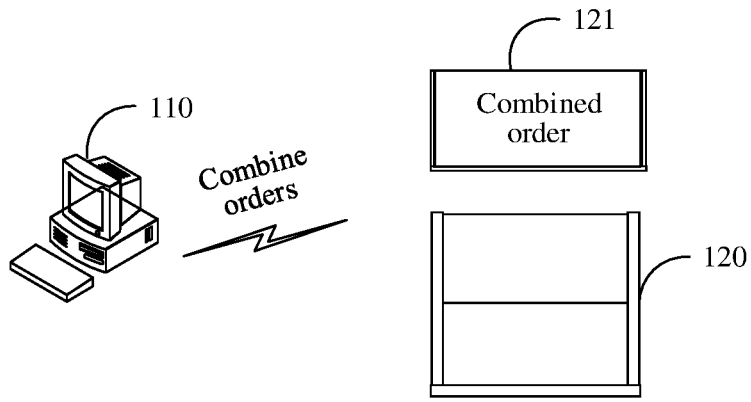
FIG. 1 is a diagram of an application scenario of an order processing method according to an embodiment of this application.

FIG. 1 is a diagram of an application scenario of an order processing method according to an embodiment of this application. As shown in FIG. 1, a warehousing management device 110 of a warehousing system 100 continuously receives original orders, and the warehousing management device 110 combines a plurality of original orders to form a combined order, and sends the combined order to a workstation 120, to achieve picking of the original orders in the combined order. A display 121 of the workstation 120 may further display order requirements of the original orders in the combined order, to guide an operator to sort goods, so as to complete the original orders.

After an existing warehousing system 100 sends a combined order to a workstation 120, and after the workstation 120 starts to process the combined order, the combined order cannot be changed, that is, a new order cannot be added to the combined order, resulting in low order processing efficiency of the new order.

To improve order processing efficiency, an order processing method provided in an embodiment of this application achieves further combination of the combined order being processed by the workstation 120, so that a new to-be-combined order can be added to the combined order being processed, which improves order processing efficiency.

Figure 2:
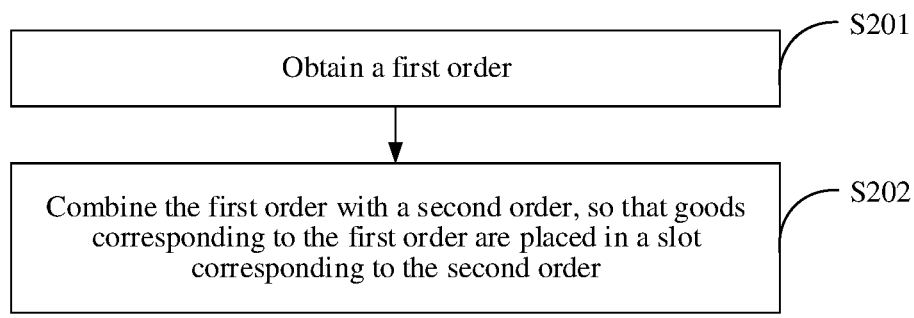
FIG. 2 is a flowchart of an order processing method according to an embodiment of this application.

FIG. 2 is a flowchart of an order processing method according to an embodiment of this application. As shown in FIG. 2, the order processing method is applicable to a warehousing system, and may be performed by an order processing device or a warehousing management device in the warehousing system, which may be in the form of a computer or a server. The order processing method provided in this embodiment includes the following steps.

Step S201: Obtain a first order.

The first order is any order needing to be processed, and may be a goods sorting order, a goods outbound order, or an order of another task type.

Specifically, the order processing device may obtain the first order sent by a user side, or the order processing device may receive the first order sent by the warehousing management device of the warehouse system. The first order may be generated at the user side according to a user requirement, and then sent to the warehousing management device of the warehousing system.

S202: Combine the first order with a second order, so that goods corresponding to the first order are placed in a slot corresponding to the second order.

The second order is an order being processed by a workstation. The second order may include a plurality of sub-orders, and each sub-order may be an order of a same user at a different time, or may be an order of a different user.

Specifically, the workstation is processing the second order, for example, the workstation is sorting goods based on an order requirement of the second order, and the sorting is not completed. At the same time, the warehousing system receives the first order, and the first order and the second order may belong to a same user, or may be orders from different users.

Specifically, the first order and the second order may be combined into a new order, namely, a combined order, then the combined order is processed by the workstation, and goods corresponding to the combined order, namely, goods corresponding to the first order and the second order, need to be placed in one or more slots corresponding to the second order.

Further, when there are a plurality of second orders being processed, the plurality of second orders may be processed by different workstations. Alternatively, one workstation may be processing a plurality of orders, and a target second order may be determined based on an occupancy rate of slots corresponding to the second orders. Then, the first order is combined with the target second order to obtain a combined order, and to indicate an operator to place goods corresponding to the combined order, namely, goods corresponding to the first order and goods correspond to the target second order, in the slot corresponding to the target second order.

Optionally, the combining the first order with a second order includes:
combining order requirements of the first order and the second order to obtain a combined order, where a slot corresponding to the combined order is the same as the slot corresponding to the second order.

The order requirement may include a required quantity of goods required by the order.

Specifically, the combining order requirements of the first order and the second order may include: merging required quantities of same goods in the first order and the second order, and adding goods and required quantities of the goods in the first order that are different from those in the second order to the second order, to form the combined order.

For example, it is assumed that a second order A being processed by the workstation includes a sub-order A1 and a sub-order A2, goods corresponding to the second order A are placed in a slot C, an order requirement of the sub-order A1 is 20 pieces of goods a1, and an order requirement of the sub-order A2 is 30 pieces of goods a2. If the warehousing system newly receives a first order B, and an order requirement of the first order B is 10 pieces of goods a1 and 30 pieces of goods b1, an order requirement of a combined order obtained after combining the order requirements of the first order B and the second order A are as follows: 30 pieces of goods a1, 30 pieces of goods a2, and 30 pieces of goods b1. In addition, the goods a1, the goods a2, and the goods b1 corresponding to the combined order are all placed in the slot C.

According to the order processing method provided in this application, for the second order being processed by the workstation, when the first order is obtained, the first order is combined with the second order, so that totes in the first order are placed in the slot corresponding to the second order, thereby improving space utilization of slots of the workstation. In addition, when there is no free slot in the workstation, the first order is processed without a need to wait for completion of processing of other orders, which improves order processing efficiency.

Figure 3:
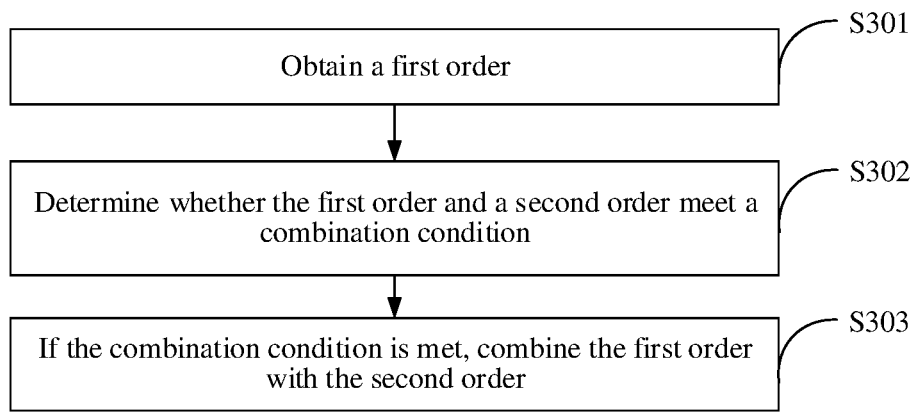
FIG. 3 is a flowchart of an order processing method according to another embodiment of this application.

FIG. 3 is a flowchart of an order processing method according to another embodiment of this application. This embodiment is based on the embodiment shown in FIG. 2 and further provides further detailed description about step S202. As shown in FIG. 3, the order processing method provided in this embodiment includes the following steps.

Step S301: Obtain the first order.

S302: Determine whether the first order and the second order meet a combination condition.

The combination condition is a condition for determining whether the first order and the second order can be combined, and whether a slot corresponding to the second order is sufficient to accommodate goods corresponding to the first order and the second order.

Specifically, whether the first order and the second order meet the combination condition may be determined based on at least one of cut-off times or order attributes of the first order and the second order or a storage restriction condition of the slot corresponding to the second order.

Specifically, when there are a plurality of second orders, whether the first order and each second order meet the combination condition may be determined sequentially in preset order, and a $1^{st}$ second order meeting the combination condition may be combined with the first order.

Further, when there are a plurality of second orders, an order score of each second order may be determined further based on remaining space of the slot corresponding to the second order, an order attribute, a cut-off time, a workstation attribute, and the like, to further perform determining of a combination condition of the first order and one or more second orders with highest order scores.

Optionally, the combination condition includes a storage restriction condition of the slot corresponding to the second order, a cut-off time restriction condition, and/or a restriction condition for an order attribute. When the first order and the second order do not meet one or more of the storage restriction condition, the cut-off time restriction condition, and the restriction condition for the order attribute, it is determined that the first order and the second order do not meet the combination condition.

The storage restriction condition is used to describe a restriction on storage of goods in the slot corresponding to the second order, which may include restrictions on a total volume of the goods, a total quantity of the goods, and a total order quantity. The cut-off time restriction condition is a condition used to restrict cut-off times of the second order and the first order. Specifically, it is possible that a time difference between the cut-off times of the two orders should be less than or equal to a preset time difference, that is, the difference cannot be too large, to avoid that orders with relatively close cut-off times cannot be completed in time, thereby avoiding causing a loss to a user. The restriction condition for the order attribute is a condition for determining combination based on order attributes of the first order and the second order.

The storage restriction condition includes a volume limit, a limit for a quantity of pieces, and an order quantity limit.

Specifically, each slot of the workstation may correspond to a different or same storage restriction condition. The volume limit may be designed based on a physical volume of the slot, and the limit for the quantity of pieces and the order quantity may be designed based on a safety principle.

Specifically, when both the first order and the second order meet these three types of restriction conditions: the storage restriction condition, the cut-off time restriction condition, and the restriction condition for the order attribute, it can be determined that the first order and the second order meet the combination condition.

Step S303: If the combination condition is met, combine the first order with the second order.

Specifically, when the first order and the second order meet the combination condition, order requirements of the first order and the second order are combined to obtain the combined order, and to indicate to place goods corresponding to the combined order in the slot corresponding to the second order.

In this embodiment, for the second order being processed by the workstation, when the first order is obtained, it is determined whether the first order and the second order meet the combination condition, and if the combination condition is met, the first order and the second order is combined. Through determining by using the combination condition, an optimized choice of order combination cases is achieved, accuracy of order combination is improved, and a case in which an order cannot be completed in time due to order combination is avoided. Therefore, totes in the first order are placed in a slot corresponding to the second order, thereby improving space utilization of slots of the workstation. In addition, when there is no free slot in the workstation, the first order is processed without a need to wait for completion of processing of other orders, which improves order processing efficiency.

Figure 4:
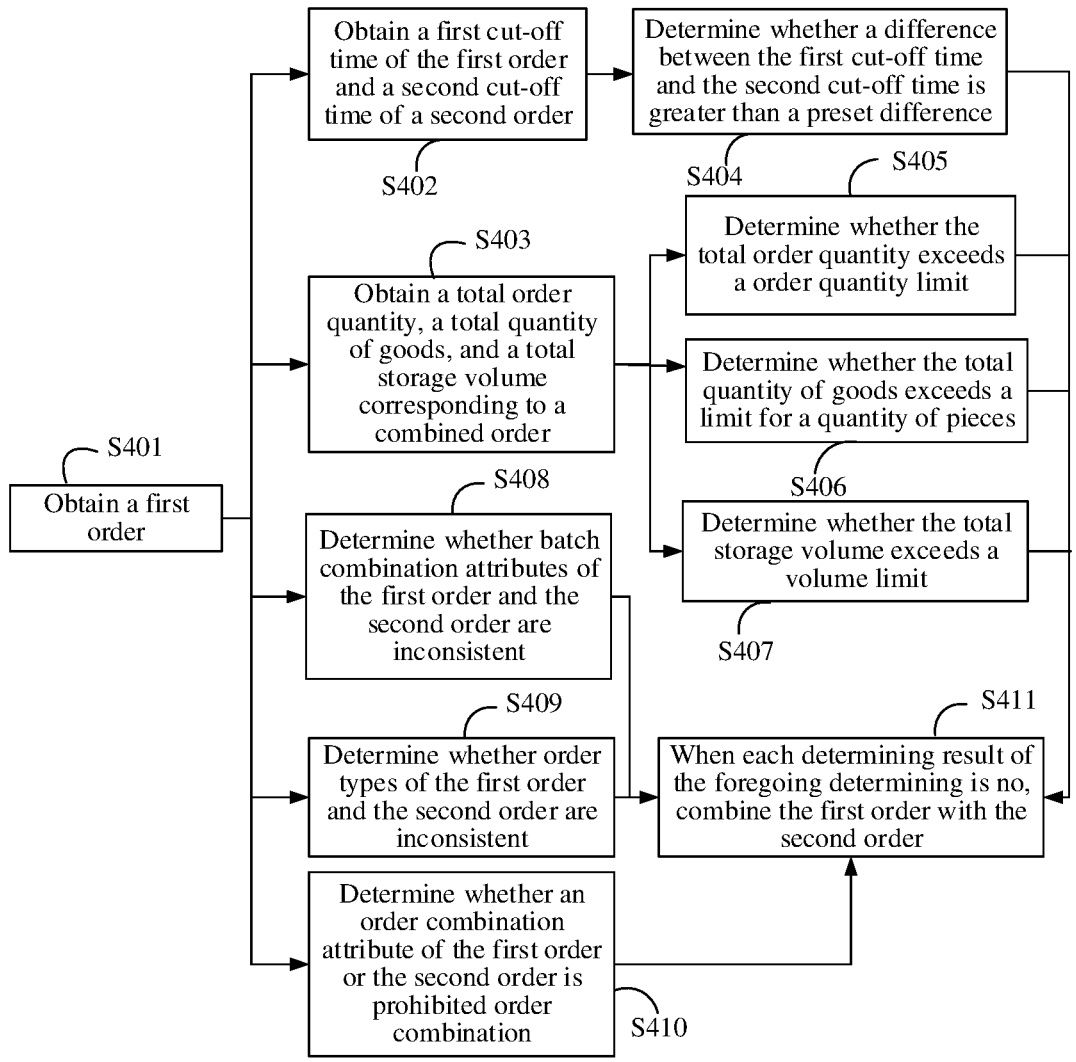
FIG. 4 is a flowchart of order processing according to another embodiment of this application.

FIG. 4 is a flowchart of an order processing method according to another embodiment of this application. This embodiment is based on the embodiment shown in FIG. 3, further provides further detailed description about step S302, and before step S302, steps of obtaining related information of a first order and a second order are added. As shown in FIG. 4, the order processing method includes the following steps.

Step S401: Obtain the first order.

Step S402: Obtain a first cut-off time of the first order and a second cut-off time of the second order.

Step S403: Obtain a total order quantity, a total quantity of goods, and a total storage volume corresponding to a combined order.

The combined order is an order corresponding to the first order and the second order after pre-combination.

Specifically, a storage volume corresponding to each of the goods may be counted in advance, and then based on a quantity of each of the goods in the first order and the second order, the total storage volume and the total quantity of goods of the combined order after the two orders are pre-combined may be determined. The total order quantity may be quantities of respective orders included in the first order and the second order. Because the second order may include a plurality of sub-orders, and the first order may also include a plurality of sub-orders, the total order quantity is a total quantity of sub-orders in the first order and the second order.

Step S404: Determine whether a difference between the first cut-off time and the second cut-off time is greater than a preset difference.

The preset difference may be 20 minutes, 30 minutes, 45 minutes, or another value.

Specifically, when the difference between the first cut-off time and the second cut-off time is greater than the preset difference, it is determined that the first order and the second order do not meet the combination condition.

Step S405: Determine whether the total order quantity exceeds the order quantity limit.

An order quantity limit of each workstation may be prestored in a warehousing management device of a warehousing system or a memory of an order processing device. The order quantity limit may be 3, 5, 9, or another value.

Specifically, if the total order quantity exceeds the order quantity limit, it is determined that the first order and the second order do not meet the combination condition.

Step S406: Determine whether the total quantity of goods exceeds the limit for the quantity of pieces.

The limit for the quantity of pieces may be determined based on different goods.

Specifically, for each slot, the limit for the quantity of pieces may be determined based on a physical volume of the slot, a physical volume of each of the goods, and a secure spacing.

Specifically, if the total quantity of goods exceeds the limit for the quantity of pieces, it is determined that the first order and the second order do not meet the combination condition.

Step S407: Determine whether the total storage volume exceeds the volume limit.

The total storage volume may be determined based on storage volumes and secure spacings of the goods in the combined order after the first order and the second order are pre-combined.

Specifically, it may be determined whether a volume difference between the volume limit and the total storage volume is greater than a specified volume value, and if the volume difference is greater than the specified volume value, it is determined that the total storage volume exceeds the volume limit, and that the first order and the second order do not meet the combination condition.

Step S408: Determine whether batch combination attributes of the first order and the second order are inconsistent.

The batch combination attribute is used to describe whether a current order allows another order of a different batch to be mixed with the current order.

Specifically, batches may be defined based on a specified time interval, for example, batches are defined in units of days and hours.

For example, orders corresponding to every 6 hours may be defined as one batch.

Specifically, the batch attribute of each order may include allowed cross-batch order combination and prohibited cross-batch order combination. When a batch attribute of an order is allowed cross-batch order combination, it indicates that the order can be combined with orders in another batch, and when a batch attribute of an order is prohibited cross-batch order combination, it indicates that the order can be combined only with orders in a same batch.

Specifically, when the first order and the second order belong to different batches, it is further necessary to perform determining of the combination condition based on batch combination attributes of the first order and the second order. Specifically, it is necessary to determine whether the batch combination attributes of both the first order and the second order are cross-batch order combination, and if yes, the batch combination attributes of the two orders are consistent, or if no, the batch combination attributes of the two orders are inconsistent.

Specifically, when the first order and the second order belong to orders of a same batch, this step may be omitted.

Specifically, when the batch combination attributes of the first order and the second order are inconsistent, it is determined that the first order and the second order do not meet the combination condition.

Step S409: Determine whether order types of the first order and the second order are inconsistent.

The order types may include a single-order type and a multi-order type, the single-order type means that an order quantity of an order is only one, and the multi-order type means that an order includes a plurality of sub-orders.

Specifically, the order types may further include order levels, and consistent order types mean that order levels of the first order and the second order are the same. The order level may be represented by a work order number, or by another code.

Specifically, consistent order types mean that order types of the first order and the second order are both single-order types or multi-order types, and the order levels are the same.

Specifically, when the order types of the first order and the second order are inconsistent, it is determined that the first order and the second order do not meet the combination condition.

Step S410: Determine whether an order combination attribute of the first order or the second order is prohibited order combination.

Specifically, when a user generates an order according to the user's requirement, the user may set the order combination attribute for the order to indicate whether the order is allowed to be combined with another order.

Specifically, when the order combination attribute of either of the first order and the second order is prohibited order combination, such as false, it is determined that the first order and the second order do not meet the combination condition.

Specifically, when a determining result of any one of steps S404 to S410 is yes, it is determined that the first order and the second order do not meet the storage restriction condition.

Steps S404 to S410 in this embodiment may be performed in parallel or in any order, which is not limited in this application.

In some embodiments, steps related to determining of the combination condition, namely, steps S404 to S410, may be partially performed. That is, only steps S404 to S407 are performed.

Step S411: When each determining result of the foregoing determining is no, combine the first order with the second order.

Specifically, when each determining result of the foregoing determining is no, it is determined that the first order and the second order meet the storage restriction condition, and then the first order and the second order are combined, so as to place totes corresponding to the first order in the slot corresponding to the second order.

In this embodiment, combination of the first order and the second order is optimally determined by checking whether the order attributes of the first order and the second order are consistent, whether the cut-off times are close, and whether the total order quantity, the total quantity of goods, and the total storage volume of the combined order obtained after the two orders are pre-combined meet storage restriction corresponding to the slot of the second order. This improves quality of combination of the first order and the second order, further improves order processing efficiency, meanwhile increases a space occupancy rate of a slot, optimizes resource allocation of the warehousing system, and improves intelligence of the warehousing system.

Figure 5:
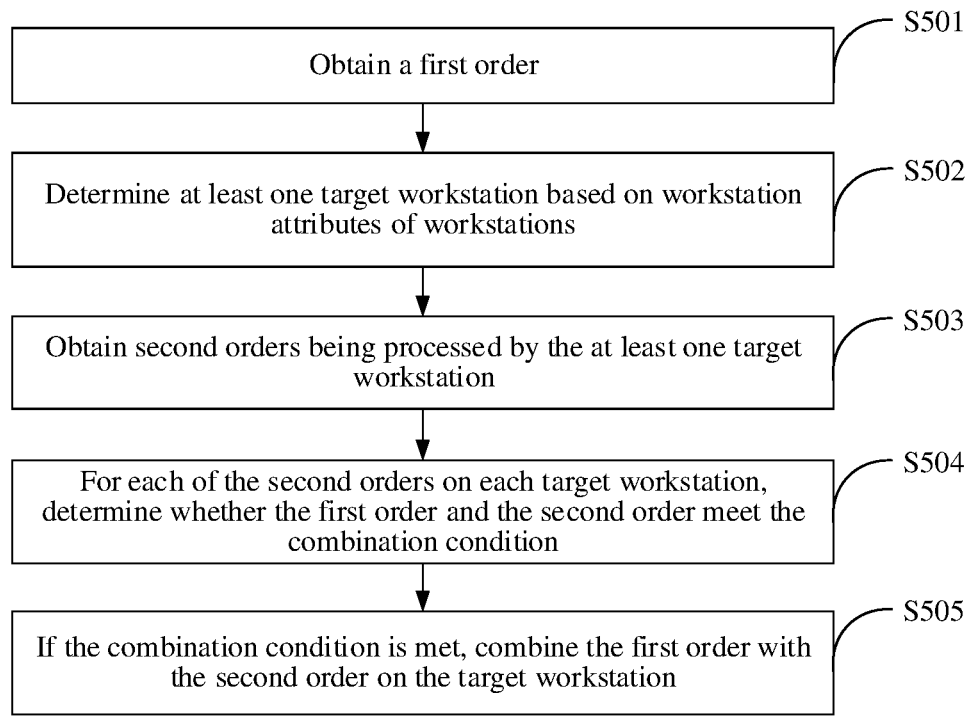
FIG. 5 is a flowchart of order processing according to another embodiment of this application.

FIG. 5 is a flowchart of an order processing method according to another embodiment of this application. This embodiment is based on the embodiment shown in FIG. 3, further provides further detailed description about step S302, and after step S301, steps of determining a target workstation are added. As shown in FIG. 5, the order processing method provided in this embodiment includes the following steps.

Step S501: Obtain the first order.

Step S502: Determine at least one target workstation based on workstation attributes of workstations.

The workstation attribute is a parameter used to describe a current status of the workstation, such as whether order reception is available.

Specifically, workstations whose workstation attributes are allowed order combination may be determined as target workstations.

Optionally, when the first order specifies a plurality of first workstations, the method further includes: obtaining each first workstation corresponding to the first order. Correspondingly, the determining the target workstation based on the workstation attributes of the workstations includes: determining the target workstation based on workstation attributes of the first workstations.

Specifically, the first order may specify a workstation, that is, specify one or more first workstations for processing goods of the first order. When the first order specifies a plurality of first workstations, during determining of the target workstation, at least one target workstation needs to be determined based on the workstation attributes of the first workstations from the first workstations specified by the first order.

Further, when only one first workstation is specified in the first order, the first workstation is determined as the target workstation.

Optionally, the workstation attribute includes the order attribute and a rated order amount, and the determining the target workstation based on the workstation attributes of the workstations includes:

for each workstation, when the order attribute of the workstation is allowed order combination, obtaining the rated order amount of the workstation; determining whether the workstation meets an order reception condition based on the rated order amount and an order amount being processed; and if the workstation meets the order reception condition, determining the workstation as the target workstation.

The rated order amount represents a rated value of an order amount that can be handled by the workstation. An order amount being processed represents a sum of task amounts of orders currently being processed by the workstation. The task amount may be a quantity of goods in the order, or a total sorted quantity, or the like.

Specifically, for each workstation, when an order attribute of each first workstation is allowed order combination, a task amount of each order being processing by the workstation is obtained to get an order amount being processing by the workstation. A first difference between a rated order amount of the workstation and the order amount being processing is calculated, and it is determined whether the first difference is greater than a first preset difference. If the first difference is greater than the first preset difference, the workstation meets an order reception condition.

Step S503: Obtain second orders being processed by the at least one target workstation.

Step S504: For each of the second orders on each target workstation, determine whether the first order and the second order meet the combination condition.

Specifically, an order score of each second order on each target workstation may be calculated, a combination determining sequence is determined in descending order of the order score, and sequentially for each second order on each target workstation, it is determined, based on the combination determining sequence, whether the first order and the second order meet the combination condition.

Specifically, a process of determining of the combination condition may include one or more steps of steps S404 to step S410 in the embodiment shown in FIG. 4. For detailed description, refer to the embodiment shown in FIG. 4. Details are not described herein again.

Step S505: If the combination condition is met, combine the first order with the second order on the target workstation.

Specifically, the first order may be combined with a $1^{st}$ second order meeting the combination condition.

In this embodiment, based on the workstation attributes, the workstations are screened to determine the target workstations, and for second orders being processed by the target workstations, determining of the combination condition is performed for the first order and the second order, to determine a second order that can be combined with the first order, so as to combine the first order with the second order, and place goods of the first order based on the slot of the second order, thereby improving flexibility and efficiency of order processing.

Figure 6:
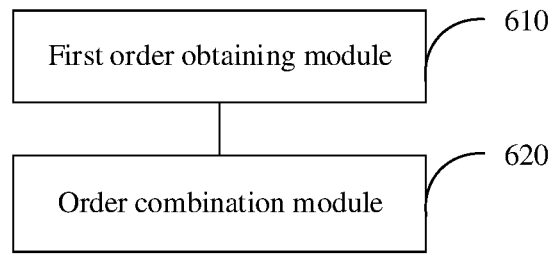
FIG. 6 is a schematic diagram of a structure of an order processing apparatus according to an embodiment of this application.

FIG. 6 is a schematic diagram of a structure of an order processing apparatus according to an embodiment of this application. As shown in FIG. 6, the order processing apparatus include: a first order obtaining module 610 and an order combination module 620.

The first order obtaining module 610 is configured to obtain a first order. The order combination module 620 is configured to combine the first order with a second order, so that goods corresponding to the first order are placed in a slot corresponding to the second order, where the second order is an order being processed by the workstation.

Optionally, the order combination module 620 is specifically configured to:
combine order requirements of the first order and the second order to obtain a combined order, where a slot corresponding to the combined order is the same as the slot corresponding to the second order.

Optionally, the order combination module 620 includes:
a combination condition determining unit, configured to determine whether the first order and the second order meet a combination condition; and an order combination unit, configured to: if the first order and the second order meet the combination condition, combine the first order with the second order.

Optionally, the combination condition includes a storage restriction condition of the slot corresponding to the second order, a cut-off time restriction condition, and/or a restriction condition for an order attribute. When the first order and the second order do not meet one or more of the storage restriction condition, the cut-off time restriction condition, and the restriction condition for the order attribute, it is determined that the first order and the second order do not meet the combination condition.

Optionally, the storage restriction condition includes a volume limit, a limit for a quantity of pieces, and an order quantity limit. The apparatus further includes:

an order parameter obtaining module, configured to: before whether the first order and the second order meet the combination condition is determined, obtain a total order quantity, a total quantity of goods, and a total storage volume corresponding to the combined order, where the combined order is an order corresponding to the first order and the second order after pre-combination.

Correspondingly, the combination condition determining unit is specifically configured to: determine whether the total order quantity exceeds the order quantity limit; determining whether the total quantity of goods exceeds the limit for the quantity of pieces; or determine whether the total storage volume exceeds the volume limit; and when a determining result of at least one of the foregoing is yes, determine that the first order and the second order do not meet the storage restriction condition.

Optionally, the apparatus further includes:
 a cut-off time obtaining module, configured to: before whether the first order and the second order meet the combination condition is determined, obtain a first cut-off time of the first order and a second cut-off time of the second order.

Correspondingly, the combination condition determining unit is further configured to:
 determine whether a difference between the first cut-off time and the second cut-off time is greater than a preset difference; and if the difference is greater than the preset difference, determine that the first order and the second order do not meet the combination condition.

Optionally, the order attribute includes a batch combination attribute, an order type, and an order combination attribute, and the combination condition determining unit is further configured to:
 determine whether batch combination attributes of the first order and the second order are inconsistent, where the batch combination attribute is used to describe whether a current order allows another order of a different batch to be mixed with the current order; determine whether order types of the first order and the second order are inconsistent; or determine whether an order combination attribute of the first order or the second order is prohibited order combination; and when a determining result of at least one of the foregoing is yes, determine that the first order and the second order do not meet the restriction condition for the order attribute.

Optionally, there are a plurality of workstations, and the apparatus further includes:
 a target workstation determining module, configured to: after the first order is obtained, determine at least one target workstation based on workstation attributes of the workstations; and a second order obtaining module, configured to obtain second orders being processed by the at least one target workstation.

Correspondingly, the combination condition determining unit is further configured to:
 for each of the second orders on each target workstation, determine whether the first order and the second order meet the combination condition.

Optionally, the apparatus further includes:
 a first workstation obtaining module, configured to: before the target workstation is determined based on the workstation attributes of the workstations, obtain each first workstation corresponding to the first order.

Correspondingly, the target workstation determining module is specifically configured to:
 determine the target workstation based on workstation attributes of the first workstations.

Optionally, the workstation attribute includes the order attribute and a rated order amount, and the target workstation determining module is specifically configured to:
 for each workstation, when the order attribute of the workstation is allowed order combination, obtain the rated order amount of the workstation; determine whether the workstation meets an order reception condition based on the rated order amount and an order amount being processed; and if the workstation meets the order reception condition, determine the workstation as the target workstation.

The order processing apparatus provided in this embodiment of this application may perform the order processing method provided in any embodiment corresponding to the first aspect of this application, and has corresponding function modules for performing the method, and beneficial effects.

Figure 7:
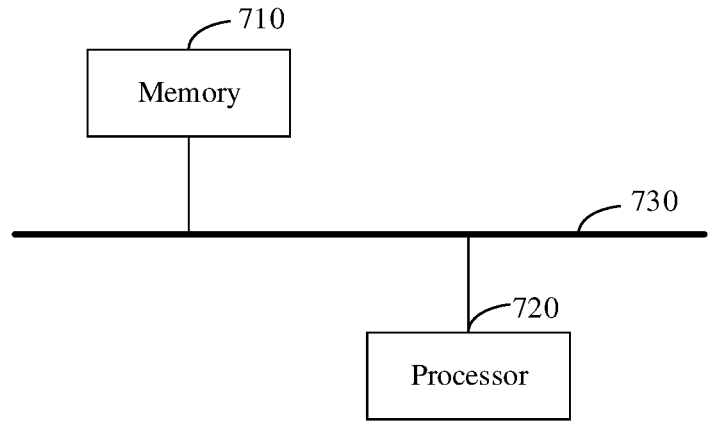
FIG. 7 is a schematic diagram of a structure of an order processing device according to an embodiment of this application.

FIG. 7 is a schematic diagram of a structure of an order processing device according to an embodiment of this application. As shown in FIG. 7, the order processing device includes: a memory 710, a processor 720, and a computer program.

The computer program is stored in the memory 710, and configured to be executed by the processor 720 to implement the order processing method provided in any one of the embodiments corresponding to FIG. 2 to FIG. 5 of this application.

The memory 710 and the processor 720 are connected through a bus 730.

Related descriptions can be understood by correspondingly referring to the related descriptions and effects corresponding to the steps in FIG. 2 to FIG. 5. Details are not repeated herein.

Figure 8:
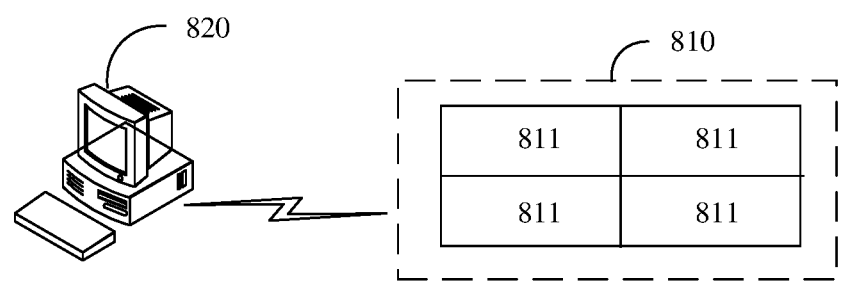
FIG. 8 is a schematic diagram of a structure of a warehousing system according to an embodiment of this application.

FIG. 8 is a schematic diagram of a structure of a warehousing system according to an embodiment of the present disclosure. As shown in FIG. 8, the warehousing system includes: a workstation 810 and an order processing device 820.

The workstation 810 includes at least one slot 811 for placing a tote. In FIG. 8, four slots 811 are used as an example. The order processing device 820 is the order processing device in the embodiment corresponding to FIG. 7 of the present disclosure.

In some embodiments, the warehousing system further includes a storage shelving unit, a warehouse management device, a robot, and the like. The workstation 810 further includes a display for displaying order requirements of orders.

An embodiment of this application provides a computer-readable storage medium, having a computer program stored thereon, where the computer program is executed by a processor to implement the order processing method provided in any one of the embodiments corresponding to FIG. 2 to FIG. 5 of this application.

The computer readable storage medium can be a ROM, a random access memory (RAM), a CD-ROM, a magnetic tape, a floppy disk, an optical data storage device, or the like.

This application further provides a program product, and the program product includes executable instructions. The executable instructions are stored in a readable storage medium. At least one processor of the order processing device or the warehousing system may read the executable instructions from the readable storage medium. The at least one processor executes the executable instructions so that the order processing apparatus implements the order processing method provided in various embodiments above.

In the several embodiments provided in this application, it should be understood that the disclosed device and method may be implemented in other manners. For example, the device embodiments described above are merely examples. For example, module division is merely logical function division and may be other division in actual implementation. For example, a plurality of modules may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. Some or all of the modules may be selected according to actual needs to achieve the objectives of the solutions of the embodiments.

In addition, function modules in the embodiments of this application may be integrated into one processing unit, or each of the modules may exist alone physically, or two or more modules are integrated into one unit. The foregoing module or unit may be implemented in a form of hardware, or may be implemented in a form of both hardware and a software function unit.

The foregoing integrated module implemented in the form of a software function module may be stored in a computer-readable storage medium. The software function module is stored in a storage medium and includes a plurality of instructions for instructing a computer device (which may be a personal computer, a server, a network device, or the like) or a processor (English: processor) to perform some of the steps of the methods described in the embodiments of this application.

It should be understood that the processor may be a central processing unit (Central Processing Unit, CPU for short), or another general-purpose processor, a digital signal processor (Digital Signal Processor, DSP for short), an application specific integrated circuit (Application Specific Integrated Circuit, ASIC for short), or the like. The general-purpose processor may be a microprocessor, or the processor may be any conventional processor or the like. Steps of the method disclosed with reference to the present invention may be directly executed and accomplished by a hardware processor, or may be executed and accomplished by a combination of hardware and software modules in a processor.

The memory may include a high-speed RAM memory, and may also include a non-volatile storage NVM, such as at least one disk storage, and may also be a USB flash drive, a removable hard disk, a read-only memory, a magnetic disk, or an optical disk.

The bus may be an Industry Standard Architecture (Industry Standard Architecture, ISA for short) bus, a Peripheral Component Interconnect (Peripheral Component, PCI for short) bus, an Extended Industry Standard Architecture (Extended Industry Standard Architecture, EISA for short) bus, or the like. The bus may include an address bus, a data bus, a control bus, and the like. For ease of representation, the bus in the accompanying drawings of this application is not limited to only one bus or only one type of bus.

The foregoing storage medium may be implemented by any type of volatile or non-volatile storage device or their combination, such as a static random access memory (static random access memory, SRAM), an electrically erasable programmable read-only memory (electrically erasable programmable read-only memory, EEPROM), an erasable programmable read-only memory (erasable programmable read-only memory, EPROM), a programmable read-only memory (programmable read-only memory, PROM), a read-only memory (read-only memory, ROM), a magnetic storage, a flash memory, a magnetic disk, or an optical disc. The storage medium may be any available medium accessible to a general-purpose or dedicated computer.

For example, a storage medium is coupled to a processor, so that the processor can read information from the storage medium or write information into the storage medium. Certainly, the storage medium may be a component of the processor. The processor and the storage medium may be located in an application-specific integrated circuit (Application Specific Integrated Circuits, ASIC for short). Certainly, the processor and the storage medium may be used as discrete assemblies existing in an electronic device or a main control device.

A person of ordinary skill in the art may understand that all or some of the steps of the method embodiments may be implemented by a program instructing relevant hardware. The program may be stored in a computer-readable storage medium. When the program is executed, steps of the foregoing method embodiments are performed. The foregoing storage medium includes: any medium that can store program code, such as a ROM, a RAM, a magnetic disk, or an optical disc.

Finally, it should be noted that: the foregoing embodiments are merely used for describing the technical solutions of the embodiments, but are not intended to limit the embodiments. Although this application is described in detail with reference to the foregoing embodiments, it should be appreciated by a person skilled in the art that, modifications may still be made to the technical solutions described in the foregoing embodiments, or equivalent replacements may be made to all or a part of the technical features; and these modifications or replacements will not cause the essence of corresponding technical solutions to depart from the scope of the technical solutions in the embodiments of this application.

What is claimed is:

1. An order processing method, comprising:
   obtaining a first order; and
   combining the first order with a second order, so that goods corresponding to the first order are placed in a slot corresponding to the second order, wherein the second order is an order being processed by a workstation, the slot is positioned in the workstation, wherein the workstation being processing the second order indicates that the workstation is sorting goods based on an order requirement of the second order, and the sorting is not completed;
   wherein the combining the first order with a second order comprises: combining order requirements of the first order and the second order to obtain a combined order, wherein the order requirements comprise a required quantity of goods required by the order;
   wherein the combining order requirements of the first order and the second order comprises: merging required quantities of same goods in the first order and the second order, and adding goods and required quantities of the goods in the first order that are different from those in the second order to the second order, to form the combined order.

2. The method according to claim 1, wherein the combining the first order with a second order comprises:
   determining whether the first order and the second order meet a combination condition; and
   if the combination condition is met, combining the first order with the second order.

3. The method according to claim 2, wherein the combination condition comprises a storage restriction condition of the slot corresponding to the second order, a cut-off time restriction condition, and/or a restriction condition for an order attribute; and when the first order and the second order do not meet one or more of the storage restriction condition, the cut-off time restriction condition, and the restriction condition for the order attribute, it is determined that the first order and the second order do not meet the combination condition.

4. The method according to claim 3, wherein the storage restriction condition comprises a volume limit, a limit for a quantity of pieces, and an order quantity limit, and before the determining whether the first order and the second order meet a combination condition, the method further comprises:

obtaining a total order quantity, a total quantity of goods, and a total storage volume corresponding to the combined order, wherein the combined order is an order corresponding to the first order and the second order after pre-combination;

the determining whether the first order and the second order meet the storage restriction condition comprises:

determining whether the total order quantity exceeds the order quantity limit;

determining whether the total quantity of goods exceeds the limit for the quantity of pieces; or determining whether the total storage volume exceeds the volume limit; and when a determining result of at least one of the foregoing is yes, determining that the first order and the second order do not meet the storage restriction condition.

5. The method according to claim 3, wherein before the determining whether the first order and the second order meet a combination condition, the method further comprises:

obtaining a first cut-off time of the first order and a second cut-off time of the second order; and the determining whether the first order and the second order meet the cut-off time restriction condition comprises:

determining whether a difference between the first cut-off time and the second cut-off time is greater than a preset difference; and if the difference is greater than the preset difference, determining that the first order and the second order do not meet the combination condition.

6. The method according to claim 3, wherein the order attribute comprises a batch combination attribute, an order type, and an order combination attribute, and the determining whether the first order and the second order meet the restriction condition for the order attribute comprises:

determining whether batch combination attributes of the first order and the second order are inconsistent, wherein the batch combination attribute is used to describe whether a current order allows another order of a different batch to be mixed with the current order;

determining whether order types of the first order and the second order are inconsistent; or determining whether an order combination attribute of the first order or the second order is prohibited order combination; and when a determining result of at least one of the foregoing is yes, determining that the first order and the second order do not meet the restriction condition for the order attribute.

7. The method according to claim 2, wherein there are a plurality of workstations, and after the obtaining a first order, the method further comprises:

determining at least one target workstation based on workstation attributes of the workstations; and obtaining second orders being processed by the at least one target workstation; and correspondingly, the determining whether the first order and the second order meet a combination condition comprises:

for each of the second orders on each target workstation, determining whether the first order and the second order meet the combination condition.

8. An order processing device, comprising: a memory and at least one processor, wherein the memory is configured to store computer-executable instructions; and the at least one processor is configured to execute the computer-executable instructions stored in the memory wherein the computer-executable instructions comprise:

obtaining a first order; and combining the first order with a second order, so that goods corresponding to the first order are placed in a slot corresponding to the second order, wherein the second order is an order being processed by a workstation, the slot is positioned in the workstation, wherein the workstation being processing the second order indicates that the workstation is sorting goods based on an order requirement of the second order, and the sorting is not completed;

wherein the combining the first order with a second order comprises: combining order requirements of the first order and the second order to obtain a combined order, wherein the order requirements comprise a required quantity of goods required by the order;

wherein the combining order requirements of the first order and the second order comprises: merging required quantities of same goods in the first order and the second order, and adding goods and required quantities of the goods in the first order that are different from those in the second order to the second order, to form the combined order.

9. The device according to claim 8, wherein the computer-executable instructions comprise: determining whether the first order and the second order meet a combination condition; and if the combination condition is met, combining the first order with the second order.

10. The device according to claim 9, wherein the combination condition comprises a storage restriction condition of the slot corresponding to the second order, a cut-off time restriction condition, and/or a restriction condition for an order attribute; and wherein the computer-executable instructions comprise:

when the first order and the second order do not meet one or more of the storage restriction condition, the cut-off time restriction condition, and the restriction condition for the order attribute, determining that the first order and the second order do not meet the combination condition.

11. The device according to claim 10, wherein the storage restriction condition comprises a volume limit, a limit for a quantity of pieces, and an order quantity limit, and before the determining whether the first order and the second order meet a combination condition, and wherein the computer-executable instructions comprise:

obtaining a total order quantity, a total quantity of goods, and a total storage volume corresponding to the combined order, wherein the combined order is an order corresponding to the first order and the second order after pre-combination;

determining whether the total order quantity exceeds the order quantity limit;

determining whether the total quantity of goods exceeds the limit for the quantity of pieces; or determining whether the total storage volume exceeds the volume limit; and when a determining result of at least one of the foregoing is yes, determining that the first order and the second order do not meet the storage restriction condition.

12. The device according to claim 10, wherein the computer-executable instructions comprise:

obtaining a first cut-off time of the first order and a second cut-off time of the second order; and determining whether a difference between the first cut-off time and the second cut-off time is greater than a preset difference; and if the difference is greater than the preset difference, determining that the first order and the second order do not meet the combination condition.

13. The device according to claim 10, wherein the order attribute comprises a batch combination attribute, an order type, and an order combination attribute, and the computer-executable instructions comprise:

determining whether batch combination attributes of the first order and the second order are inconsistent, wherein the batch combination attribute is used to describe whether a current order allows another order of a different batch to be mixed with the current order;

determining whether order types of the first order and the second order are inconsistent; or determining whether an order combination attribute of the first order or the second order is prohibited order combination; and when a determining result of at least one of the foregoing is yes, determining that the first order and the second order do not meet the restriction condition for the order attribute.

14. The device according to claim 9, wherein there are a plurality of workstations, and after the obtaining a first order, and the computer-executable instructions comprise:

determining at least one target workstation based on workstation attributes of the workstations;

obtaining second orders being processed by the at least one target workstation; and for each of the second orders on each target workstation, determining whether the first order and the second order meet the combination condition.

15. A computer program product, comprising: a computer program, wherein computer-executable instructions comprised in the computer program is executed by a processor, and the computer-executable instructions comprise:

obtaining a first order; and combining the first order with a second order, so that goods corresponding to the first order are placed in a slot corresponding to the second order, wherein the second order is an order being processed by a workstation, the slot is positioned in the workstation, wherein the workstation being processing the second order indicates that the workstation is sorting goods based on an order requirement of the second order, and the sorting is not completed;

wherein the combining the first order with a second order comprises: combining order requirements of the first order and the second order to obtain a combined order, wherein the order requirements comprise a required quantity of goods required by the order;

wherein the combining order requirements of the first order and the second order comprises: merging required quantities of same goods in the first order and the second order, and adding goods and required quantities of the goods in the first order that are different from those in the second order to the second order, to form the combined order.

16. The computer program product according to claim 15, wherein the computer-executable instructions comprise: determining whether the first order and the second order meet a combination condition; and if the combination condition is met, combining the first order with the second order.

17. The computer program product according to claim 16, wherein the combination condition comprises a storage restriction condition of the slot corresponding to the second order, a cut-off time restriction condition, and/or a restriction condition for an order attribute; and wherein the computer-executable instructions comprise:

when the first order and the second order do not meet one or more of the storage restriction condition, the cut-off time restriction condition, and the restriction condition for the order attribute, determining that the first order and the second order do not meet the combination condition.

18. The computer program product according to claim 17, wherein the storage restriction condition comprises a volume limit, a limit for a quantity of pieces, and an order quantity limit, and before the determining whether the first order and the second order meet a combination condition, and wherein the computer-executable instructions comprise:

obtaining a total order quantity, a total quantity of goods, and a total storage volume corresponding to the combined order, wherein the combined order is an order corresponding to the first order and the second order after pre-combination;

determining whether the total order quantity exceeds the order quantity limit;

determining whether the total quantity of goods exceeds the limit for the quantity of pieces; or determining whether the total storage volume exceeds the volume limit; and when a determining result of at least one of the foregoing is yes, determining that the first order and the second order do not meet the storage restriction condition.

19. The computer program product according to claim 17, wherein the computer-executable instructions comprise:

obtaining a first cut-off time of the first order and a second cut-off time of the second order; and determining whether a difference between the first cut-off time and the second cut-off time is greater than a preset difference; and if the difference is greater than the preset difference, determining that the first order and the second order do not meet the combination condition.

20. The computer program product according to claim 17, wherein the order attribute comprises a batch combination attribute, an order type, and an order combination attribute, and the computer-executable instructions comprise:

determining whether batch combination attributes of the first order and the second order are inconsistent, wherein the batch combination attribute is used to describe whether a current order allows another order of a different batch to be mixed with the current order;
determining whether order types of the first order and the second order are inconsistent; or
determining whether an order combination attribute of the first order or the second order is prohibited order combination; and
when a determining result of at least one of the foregoing is yes, determining that the first order and the second order do not meet the restriction condition for the order attribute.

21. The computer program product according to claim 16, wherein there are a plurality of workstations, and after the obtaining a first order, and the computer-executable instructions comprise:
determining at least one target workstation based on workstation attributes of the workstations;
obtaining second orders being processed by the at least one target workstation; and
for each of the second orders on each target workstation, determining whether the first order and the second order meet the combination condition.

\* \* \* \* \*